(12) United States Patent
Cort

(10) Patent No.: US 6,896,815 B2
(45) Date of Patent: May 24, 2005

(54) METHODS FOR REMOVING HEAVY METALS FROM WATER USING CHEMICAL PRECIPITATION AND FIELD SEPARATION METHODS

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 10/152,024

(22) Filed: May 22, 2002

(65) Prior Publication Data

US 2003/0082084 A1 May 1, 2003

Related U.S. Application Data

(60) Provisional application No. 60/352,265, filed on Jan. 30, 2002, provisional application No. 60/330,973, filed on Nov. 5, 2001, and provisional application No. 60/294,022, filed on May 30, 2001.

(51) Int. Cl.$^7$ .................................................. C02F 1/48
(52) U.S. Cl. .................. 210/695; 210/705; 210/711; 210/713; 210/714; 210/725; 210/727; 210/912; 210/913; 210/914
(58) Field of Search ................................ 210/631, 695, 210/705, 711, 713, 714, 724, 725, 727, 728, 737, 912, 913, 748, 914

(56) References Cited

U.S. PATENT DOCUMENTS

| | | | | |
|---|---|---|---|---|
| 3,697,420 A | * | 10/1972 | Blaisdell et al. | 210/695 |
| 3,740,331 A | | 6/1973 | Anderson | 210/727 |
| 4,329,224 A | * | 5/1982 | Kim | 210/709 |
| 4,422,943 A | | 12/1983 | Fender | 210/716 |
| 4,432,880 A | * | 2/1984 | Talbot | 210/725 |
| 4,981,593 A | * | 1/1991 | Priestley et al. | 210/613 |
| 5,000,853 A | * | 3/1991 | Reischl et al. | 210/616 |
| 5,441,648 A | * | 8/1995 | Lidzey | 210/695 |
| 5,505,857 A | * | 4/1996 | Misra et al. | 210/709 |
| 5,660,735 A | * | 8/1997 | Coltrinari et al. | 210/723 |
| 6,099,738 A | | 8/2000 | Wechsler | 210/695 |

OTHER PUBLICATIONS

Dept. of the Army Manual 1110–1–4012, p. 2–2 Chemical Engineering, v. 104, issue 2, p. 66.
Tsouris et al, "Electrocoagulation for magnetic seeding of collodial particles", Colloids and Surfaces A(2000) (preprint).
Tsouris et al, "Flocculation of Paramagnetic Particles in a Magnetic Field", J. of Collodial and Interfaces Science, 171.
Chin et al "Shear–Induced Flocculation of Colloidal Particles in Stirred Tanks", J. Collod.and Interface Science 206, 532–545 (1998).
Ying et al "high–gradient magnetically seeded filtration", Chem. Eng. Science 55 1101–1113 (2000).

* cited by examiner

Primary Examiner—Peter A. Hruskoci
(74) Attorney, Agent, or Firm—Michael de Angeli

(57) ABSTRACT

A two-step chemical precipitation process involving hydroxide precipitation and sulfide precipitation combined with "field separation" technology such as magnetic separation, dissolved air flotation, vortex separation or expanded plastics flotation, effectively removes chelated and non-chelated heavy metal precipitates and other fine particles from water. In the first-step, the non-chelated heavy metals are precipitated as hydroxides and removed from the water by a conventional liquid/solids separator such as an inclined plate clarifier to remove a large percentage of the dissolved heavy metals. The cleaned water is then treated in a second precipitation step to remove the residual heavy metals to meet discharge limits. In the second precipitation step, any metal precipitant more effective than hydroxide for metal precipitation can be used. The invention improves metal removal, lowers cost because fewer chemicals are used, produces less sludge, and reduces the discharge of toxic metals and metal precipitants to the environment.

12 Claims, 4 Drawing Sheets

METHODS FOR REMOVING HEAVY METALS FROM WATER USING CHEMICAL PRECIPITATION AND FIELD SEPARATION METHODS

CROSS-REFERENCE TO RELATED APPLICATIONS

This complete application claims priority from three provisional patent applications, Ser. Nos. 60/294,022 filed May 30, 2001, 60/330,973, filed Nov. 5, 2001, and 60/352,265, filed Jan. 30, 2002. These three patent applications were combined into one patent application because they all deal with the two-step chemical precipitation and "field separation" technologies to remove the fine metal precipitates.

BACKGROUND OF THE INVENTION

The removal of heavy metals from water is an important aspect of water treatment. There are many technologies for accomplishing this; however, one of the most cost effective means is chemical precipitation.

"Chemical precipitation", as used herein and generally in the art, refers to reacting dissolved metals with an additive chemical of some sort so that the metals to be removed are rendered insoluble, so that they can then be separated from the water. Raising the pH to a neutral or an alkaline level will precipitate most heavy metals as metal hydroxides. However, hydroxide precipitation is usually not effective enough to meet strict new discharge limits. Metal hydroxides are not insoluble enough to meet these limits and metal ions that are chelated usually will not precipitate at all. Therefore, more advanced treatments such as reaction with organic or inorganic sulfides must be used. These chemistries will produce metal sulfides that have lower solubility than hydroxides and will break chelate bonds to allow the metals to precipitate.

The Department of Army Engineering and Design Manual No.1110-1-4012 on page 2—2 (Precipitation/Coagulation/Flocculation), shows the difference between the solubility of metal hydroxides and metal sulfides. Under ideal conditions, the optimum metal hydroxide solubility ranges from $10^2$ to $10^{-2}$ mg/L. Under ideal conditions, the optimum metal sulfide solubility ranges from $10^{-2}$ to $10^{-12}$ mg/L.

If all the metals (chelated and non-chelated) are precipitated with sulfide chemicals in a one-step precipitation the removal is complete but the cost of treatment is high and often prohibitively high for waste streams containing high concentrations of heavy metals. If most of the metals are first removed as metal hydroxide in a first-step precipitation, and the remaining metals are polished out in a second-step precipitation (sulfide) the removal of metals is improved and the cost of treatment is much lower. In order to do this effectively, this present invention shows it is beneficial to use selected "field separation" methods that has not been used or contemplated before in combination with this two-step precipitation process (hydroxide and sulfide).

The concept of removing heavy metals using sulfides and ferrous was described by Anderson in U.S. Pat. No. 3,740,331. However, Anderson fails to suggest refinements and additions provided by the present invention that make this basic technique improved in today's processing environment. Specifically, Anderson does not suggest that removing metals can be made more efficient if the heavy metals are removed in a two-step precipitation process. The teachings of the Anderson patent are simply that using ferrous with sulfide will result in better metal removal. No suggestion is made to use "field separation" methods that are effective in removing fine and fragile metal precipitates.

The fundamental disadvantage of doing a sulfide precipitation according to Anderson is that it produces very fine colloidal particles that are hard to remove. The present inventor attempted to remove these particles with a sand filter or with a one micron sized back washable filter and was unsuccessful.

The teachings of Fender in U.S. Pat. No. 4,422,943 describe the benefits of using iron pyrite as a source of sulfide to precipitate heavy metals as metal sulfides. He also describes the benefits of using a two-step precipitation process. In his claim #2, he describes the step of separating said precipitated sulfides by filtration (specifically sand filtration), but does not contemplate using the "field separation" methods described in this present invention. However, to accomplish filtration, he uses a polymer to increase the particle size so the sand filter can remove the metal sulfides. It is known in the art that using an organic polymer to increase the size of the metal sulfide precipitates will cause fouling problems with a sand filter. Therefore, the present inventor concludes that his approach is improved because the "field separation" methods covered by this present invention are not subject to fouling like filters. Also, sand filters have a limitation on the size of particles they can remove. A well designed multi-media sand filter can remove particles only down to about 20 micron in size. Metal sulfide precipitation will produce colloidal sized particles of less than one micron in size and these particles will pass through a sand filter. With the exception of microfiltration which can remove sub-micron sized particles, the present inventor has found no filtration equipment capable of consistently and economically removing fine metal sulfide particles. The present inventor has experimented with a back washable filter manufactured by Asahi. It had a plastic-mesh filtering element with a one micron opening size. This was significantly smaller than the metal sulfide precipitates which were at least 30 micron because they were visible to the naked eye. However, the present inventor learned that even at low operating pressures (about 10 psi), the pressure was enough to deform the shape of the metal sulfide precipitates and force these >30 micron sized particles through one micron sized openings.

The only commonality between this present invention and the Fender patent is they both recognize the economic importance of using a two-stage precipitation process, which is known art. In summary, this present invention deals with other forms of soluble and insoluble sulfide treatment rather than iron pyrite and "field separation" equipment rather than filters, which is an improvement to the Fender patent. The Fender patent only deals with iron pyrite as a source of sulfide to precipitate heavy metals. This patent deals with other sulfides that are known to produce small metal sulfide particles that are difficult to filter.

There is a difference between filtration equipment and "field separation" equipment as discussed in the Chemical Engineering document Dated February 1997, Volume 104, Issue 2, Page 66. Filtration equipment includes: straining, cake filtration, deep bed filtration, and membrane filtration and always involves a barrier that prevents the passage of specific sized particles. "Field separation" includes: gravitational settling, centrifugal settling, hydrocyclone separation, dissolved air flotation, expanded plastics flotation, and magnetic separation. The difference is filtration involves a physical barrier to trap particles while "field separation" involves force-fields like molecular, gravitational, centrifugal, and magnetic to separate particles from water.

U.S. Pat. No. 6,099,738 to Wechsler deals with a method and system for removing solutes from a fluid using magnetically conditioned coagulation. This method includes the steps of magnetically conditioning the fluid by applying a magnetic field to enhance the precipitation of solute particles for coagulation; adding a coagulant to the fluid before, during, and after application of the conditioning magnetic field to coagulate the increased available solute particles to form colloids; and collecting the colloids for removal from the fluid. Wechsler neither contemplates combining magnetic seeding and polymer addition with a two-step metal precipitation process as a means for efficiently removing heavy metals from wastewater, nor combining magnetic separation principles with gravity settling in one treatment vessel as described herein.

In this present invention, any magnetic separation method can be used; however, the preferred embodiment of this present invention is novel because the magnetic separator used to capture the magnetic particles are mounted in the treatment tank rather than as a separate collection device. This approach has three advantages: (1) one less piece of equipment is needed, (2) the system can be cleaned without interrupting the water flow, and (3) permanent magnets can be used rather than electromagnets.

Magnetic seeding is used according to this present invention to remove precipitated pollutants and other non-magnetic particles from water. Magnetic seeding is known per se for such purposes. Specifically, the Department of Energy published studies (C. Tsouris, et. al., Electrocoagulation for magnetic seeding of colloidal particles, *Physiochem Eng. Aspects* accepted paper December 1999; C. Tsouris, et. al., Flocculation of paramagnetic particles in a magnetic field, *Journal of Colloid and Interface Science*, 171, 319–330; T-Y Ying et. al., High-gradient magnetically seeded filtration, *Chemical Engineering Science* 55 (2000) 1101–1113) addressing the effectiveness of magnetic seeding to remove colloidal sized particles. The DOE investigators studied magnetically seeded solid/liquid separation by combining magnetic seeding under turbulent-shear flow and high gradient magnetic filtration. They concluded that magnetic seeding was effective in removing fine particles. They used seed particle concentration, solution pH, and ionic strength parameters that determine the zeta-potential of particles to significantly affect the particle removal performance. They did not use organic polymers to bind the magnetic seed materials to the low-magnetic particles to enhance removal, and did not apply magnetic seeding and filtration principles to the second step of a two-step metal precipitation process using sulfide precipitants.

In researching the present patent work, the present inventor found that a strong enough bond between the magnetic seed material and the non-magnetic metal sulfide precipitates to enable reliable separation could not be achieved unless a flocculating polymer was also used. The polymer binds the magnetic seed material together with the fine metal sulfide particles so they can be removed by a low field strength magnetic separator or by gravity settling.

Another novel approach of this present invention is the removal of fine precipitates in the second step of this two-step precipitation process by the use of expanded plastics to enhance flotation. The present inventor successfully attached fine metal precipitates to expanded polystyrene (EPS) with a flocculating polymer. Then the EPS floats carrying the metal precipitates out of the water stream.

The concept of enhanced flotation using highly buoyant ESP is similar to the principle used in DAF (Dissolved Air Flotation) equipment. DAF uses micro-bubbles to float fine particles out of water while the present invention uses an expanded plastic like ESP. The advantage of the present invention is no energy is needed to compress the air and wastewater to form the micro-bubbles.

To date, two-step precipitations (hydroxide and sulfide) have been rarely used because they require additional equipment and space. This level of treatment was not necessary because existing regulatory limits could be achieved with a one-step hydroxide precipitation. However, with tighter regulations, a two-step precipitation process is now justified but the traditional clarification approach is often infeasible because of the high residence times required which causes cost and space limitations.

The present inventor has done a patent and literature search and can find no reference to any of the methods described in this present invention. This present invention describes better ways to do a two-step precipitation that is less costly and smaller in size than a traditional clarifier yet able to handle the metal precipitates in a gently way that prevents their breakup.

BRIEF SUMMARY OF THE INVENTION

It is the object of this present invention to provide a cost- and chemically-effective process for treating wastewater and all waters requiring the removal of metal precipitates or other fine particles.

A fundamental aspect of the present invention is the use of certain "field separation" methods in combination with either a two-step chemical precipitation process for heavy metal removal or a one-step method for removing other fine pollutant particles.

The process covered by this present invention provides an effective way to remove fine metal sulfide precipitates and metal hydroxide precipitates, which in turn makes it possible to effectively use a two-step precipitation method. The two-step precipitation method reduces chemical costs, reduces sludge, allows metals to be recycled, and reduces the amount of metals discharged to the environment.

This present invention relates to the removal of all heavy metals from water, but most particularly to the removal of cadmium, chromium, copper, lead, mercury, nickel, and zinc. More specifically, this present invention pertains to combining methods for precipitating heavy metals in an efficient two-step chemical precipitation process (preferably hydroxide and sulfide precipitation steps) with improved methods for removing the fine metal precipitates produced in each precipitation stage.

The first step of the present invention is to precipitate non-chelated metals as metal hydroxides. This requires the pH to be raised as necessary to reach an optimum precipitation point for the metals in question. This typically is in the 6–10 pH range. However, as the pH of wastewater must generally be in the 6–9 pH range before it can be discharged, precipitating the heavy metals as hydroxides according to this aspect of the present invention does not increase treatment cost. When this first step is completed, most (85% to 95% depending on the level of chelating agents present in the wastewater) of the heavy metals will precipitate as metal hydroxides. Any alkaline material can be used to raise the pH in the first step of the process. Alkaline materials that are lower in cost and form less sludge are preferred. Suitable alkaline materials are lime, limestone, caustic soda, soda ash, or magnesium hydroxide.

The conventional approach for metal removal is the one-step precipitation process described above. As typically implemented, this process normally requires a pH control tank, a floc tank, a clarifier, and a final filter. The main disadvantage of a one-step precipitation process is that it either cannot meet the discharge limits if hydroxide precipitation is practiced or it is very costly if sulfide treatment is practiced when metal concentrations are high.

This present invention solves these problems and provides a better and more cost effective method for removing dissolved metals from water. The present invention is an improvement over a one-step precipitation process because it lowers chemical usage, produces less sludge, and gets better metal removal. Chemical usage is reduced because all the metals are not precipitated with sulfide chemicals. Sludge quantities are reduced because less chelate-breaking chemicals like ferrous are needed in a two-step precipitation. Since most of the metals are recovered in the hydroxide form, they can easily be recovered by electrowinning and hydrometallurgical processing techniques. The amounts of metals released into the environment are less because sulfide chemicals can produce lower metal concentrations when a first stage hydroxide precipitation process lowers the starting concentration of the metals.

Several embodiments of the present invention are described. In all embodiments, the first step of the metal removal process is hydroxide precipitation and removal with a clarifier or other suitable "field separation" device. The second step of the process is preferably sulfide precipitation followed by a second "field separation" method capable of removing fine particles in the range 0.1 to 100 microns. All of the "field separation" processes have to be able to remove small fragile metal precipitates.

Until now, there have been few applications for two-step precipitation processes. Regulations are considered to be liberal by many and one-step precipitation was usually sufficient. In the few known applications with two-step precipitation, clarification using gravity settling was practiced (this approach is not covered by this patent). This was because the metal precipitates are fragile and will break or deform when aggressively filtered.

For example, the present inventor attempted to use so-called "dead end" filtration using a back-washable filter manufactured by Asahi. It was not successful because the pressure across the filtration element was too great (greater than 10 psi), causing the fragile metal precipitates to deform and break through the filter cloth.

The present inventor also attempted to remove fine sulfide precipitates in a sand filter. The particles were too small and exceeded the limit of the sand filter to remove particles smaller than 10 micron.

Clarifiers are not well suited for the light solids loading found in polishing applications because they are dependent upon the type and frequency of collisions between the particles. Clarifiers are also large in size and cannot fit into many existing facilities.

The following "field separation" processes have been tested and found with some modification according to this present invention to be suitable when used separately or in combination with a two-step precipitation process.

Magnetic Separation:

The process and apparatus of this present invention accomplish the efficient removal of fine particles from water by using gravitational and magnetic forces in one treatment vessel. A magnetic seed material is necessary when the fine particles to be removed do not possess magnetic properties and a flocculating agent is necessary to bind the magnetic seed material to the non-magnetic particles.

The preferred embodiment of this present invention, as illustrated in FIG. 1, is optimized for the removal of precipitated heavy metals from water, but the apparatus and process of this invention will also remove most suspended solids from water. A required step in the chemical precipitation of heavy metals from water is to precipitate the metals as either hydroxides or sulfides by pH adjustment or the addition of a sulfide precipitant respectively. These metal precipitates are small and fragile and require gentle liquid/solid separation methods.

Furthermore, such metal precipitates generally do not exhibit magnetic properties. Therefore a magnetic seed material, preferably magnetite ($Fe_3O_4$), is added to the non-magnetic metal precipitates. A flocculation agent, preferably an anionic polymer, is added to ensure that the magnetite is attached to the metal precipitates. This attachment process provides a magnetic anchor for the heavy metal precipitates and allows those particles that are not normally magnetic to be removed by with a magnetic field.

The addition of the anionic polymer, preferably a polyacrylamide based polymer A3040L sold by Stockhausen, causes the mixture of metal precipitates and magnetite particles to flocculate. Because the magnetite is heavy, the majority of the flocculate quickly settles to the bottom of the treatment vessel, becoming a sludge that can be removed and dewatered. Gentle agitation of the solution promotes flocculation by keeping the heavy magnetite particles in suspension at the bottom of the treatment vessel to improve the flocculation and the absorption process of dissolved heavy metals. This gentle agitation can be caused by mechanical mixing or by a naturally induced vortex action. However, caused by the upward flow of water, some fine particles will be carried to the top of the treatment vessel. The magnetic separator captures these rising fine magnetic particles before they are discharged. By comparison, in the absence of the magnetic separator, given sufficient time, all of the flocculated fine particles would settle out by gravity, but depending on the nature of the particles, this could take a long time and would necessitate greatly increasing the size of the treatment vessel. As the flow through the treatment vessel increases, there are even greater upward forces on these fine particles preventing them from settling. Since the magnetic separator can capture the magnetic particles at high velocities, the fine particles can be allowed to rise in the treatment vessel. This allows the treatment vessel to be smaller which results in higher water velocities. Also, the combination of gravity settling at the bottom of the treatment vessel and magnetic separation at the top of the treatment vessel allows the present inventive process to remove fine particles that have a tendency to either sink or float.

A bench scale system was constructed with a five-gallon tank, a variable speed mixer, and a permanent magnet. A mixture of metal sulfides, magnetite, and polymer were added to the tank and the variable speed mixer set at a moderate speed. This flocculated the mixture and the density of the flocculated particles caused most of them to settle rapidly to the bottom of the tank. The speed of the mixer was slowed until only a relatively small percentage of the particles were suspended. Water was injected into the tank at a rate of 2.5 gallons per minute and excess water was discharged from the top of the tank. A permanent magnet was placed at the discharge point and collected the suspended particles, leaving the discharge water almost completely free of suspended particles. When the magnet was removed, the quantity of particles discharged was unacceptably high. This test demonstrated that a permanent magnet could be employed to remove a high percentage of magnetic particles from a moving stream of water. It showed that placing the magnet in the same treatment tank where gravity settling occurs reduces capital cost and allows the system to operate continuously. The magnet is so effective at removing particles comprising various undesirable components flocculated with magnetite particles that a high wastewater throughput is possible.

Another pilot-scale system was tested to better evaluate the benefit of high throughput capacity and the ability to capture the magnetic particles with a collection of permanent magnets. The pilot scale system had a capacity of 15 gallons and at the discharge point bar magnets were placed in a trough. The bar magnets were constructed of a ceramic material and were laid flat in the trough with the water containing the magnetic particles flowing through the trough and over the bar magnets. Tests showed that the system could operate at a flow rate of at least 10 gallons per minute with no visible discharge of magnetic particles. At 15 gallons per minute, the residence time for the system would be one minute. This compares very favorably with other ballast aided clarification systems. The Actiflo system manufactured by US Filter requires a residence time of between 10 and 15 minutes.

In the preferred embodiment, the magnetic separator is cleaned continuously. In one embodiment, the magnetic separator consists of several round disks mounted on a revolving shaft. A stationary scraper blade removes the heavy deposits of magnetic material from the revolving magnets. The removed sludge quickly settles to the bottom of the treatment vessel and is not re-entrained into the water flow. This is because the collected particles have retained a magnetic charge imparted from the permanent magnets causing the particles to clump together. Therefore they quickly settle and are withdrawn and circulated for reuse or recovery. The scope of the invention is not to be limited by variations in the magnetic separator configuration or by other methods used for cleaning the magnetic separator.

The flocculating polymer forms a bond between the magnetite and the metal precipitate to withstand the forces of gentle flow, magnetic separation, and gravity settling. However, under high-shear mixing, the bond between the magnetite and metal precipitate is broken. This discovery is useful because it allows the magnetite to be reused. The liberated magnetite is either separated from the metal precipitate by gravity or by magnetic forces. The magnetite is sent back for reuse and the remaining metal precipitates are removed from the system and dewatered with appropriate dewatering equipment.

The precipitated metals or other fine particles can also be chemically separated from the magnetite. Magnetite is chemically stable and does not measurably dissolve with pH adjustment. This is not the case with some metal precipitates. For example, metal hydroxides can be easily dissolved by pH adjustment. Therefore, a mixture of magnetite and metal hydroxide precipitates can be easily separated by pH adjustment. Once the metal hydroxide particles are dissolved, the magnetite can then be easily separated and returned to the wastewater treatment system for reuse. The dissolved metals then can be re-precipitated and filtered out of the wastewater for disposal or recovery.

The recovered magnetite can be reused many times and testing has confirmed that there is no practical limit to the number of times it can be reused. However, some small quantity of the magnetite is lost in the process and must be replenished as necessary.

The magnetite provides several advantages. It provides solid particles to enhance chemical precipitation and coagulation. It adsorbs dissolved metals. It is heavy and provides good settling action so that most of the magnetic particles settle out of the flow before reaching the magnetic separator. This reduces the solids loading on the magnetic separator As noted, the use of magnetic seed material to remove non-magnetic material is not new. What is new and novel about using magnetic separation according to this present invention are: (1) the combination of magnetic seeding practices with a two-step chemical precipitation of heavy metals to make it possible to cost effectively remove the heavy metals down to very low levels, (2) combining gravity settling and magnetic separation in one treatment vessel, and (3) recovering the magnetite by using forces to break the bond between the magnetite and the fine non-magnetic particles.

The second precipitation step of the present invention preferably uses organic or inorganic sulfide chemicals. However, any metal precipitants (i.e., organic sulfides, inorganic sulfides, sodium borohydride, ferrous sulfate, ferrous chloride, etc.) that are more effective than hydroxide precipitants are suitable for the second step precipitation and are within the scope of the present invention. It is sometimes necessary to add a ferrous salt as a co-precipitant to break metal-chelate bonds to improve metal removal levels by co-precipitation effects. Any ferrous product will work but either ferrous sulfate or ferrous chloride is preferred; these are economical water treatment chemicals that add no extra toxicity to the water.

The inventor's experiments show that permanent magnets with a field-strength of 0.2 tesla and 3.0 tesla effectively remove these magnetite/metal sulfide bonded particles. Magnetite is a naturally occurring magnetic material and is preferred in the practice of this present invention. However, any material showing good magnetic susceptibility can be used. Literature shows that magnetic materials can be formed either chemically from ferrous and ferric materials or electrically from iron electrodes. These sources of magnetic seed material are also acceptable and within the scope of the present invention.

As far as known to the present inventor, neither is there any prior art teaching magnetic seeding in combination with a hydroxide/sulfide two-step precipitation process nor practicing magnetic separation and gravity settling in one treatment vessel.

Dissolved Air Flotation (DAF):

As a further alternative to magnetic separation, enhanced flotation using micro bubbles can be employed in this present invention. These devices are effective in gently removing fine metal precipitates from water. Air is dissolved in the water and when the pressure is released, the air comes out of solution in the form of fine micro-bubbles. These bubbles attach to the fine metal precipitates causing them to float. These floating particles are then skimmed off the surface of the water and disposed.

There is no known prior art teaching the combination of DAF units with a hydroxide/sulfide two-step precipitation process as described in this present invention.

Vortex Separation:

Another alternative to magnetic separation in the practice of this present invention is the use of vortex separation. Vortex separators are field separators that utilize tangential flow and gravity forces to settle out large, dense particles. This process is enhanced by this present invention of using magnetite and an anionic flocculant to increase the weight and size of the precipitates to make them settle quicker. The clear water rises to the top of the vortex separator and the heavy solids fall to the bottom.

This present invention is the first application of using vortex separators to remove metal precipitates following a hydroxide precipitation step and the first use of using magnetite as a ballast to promote rapid settling in a vortex separator.

Vortex separation is the preferred embodiment of using field separation technologies based on gravity because it does not cause breakup of the fragile metal precipitate floc. However, this present invention also covers other field separation technologies (i.e., hydrocycloning and centrifugation), based on using centrifugal forces.

Expanded Plastics Flotation:

The process and apparatus of this present invention accomplishes the efficient removal of fine contaminant particles from water by using enhanced flotation in combination with a two-step precipitation process for heavy metal removal. This present invented method of enhanced flotation uses a flocculating polymer to attach a buoyant material, in this case an expanded plastic, to the fine contaminant particles. In one embodiment of this present invention, an anionic polymer is first mixed with the fine contaminant particles to be removed, and a second cationic polymer mixed with the buoyant material, so as to ensure attraction of the buoyant material to the fine contaminant particles to be removed. The combined buoyant material and fine contaminant particles then float to the surface of the water, from where they can readily be removed. The buoyant material can then be reused; after one or more uses the fine contaminant particles can be separated from the buoyant material, enabling further reuse thereof.

A pilot-scale system was constructed with a 15-gallon mix tank and a variable speed mixer. A mixture of water containing 20 ppm metal sulfide particulates and an anionic flocculant flowed into the tank, which contained expanded polystyrene (EPS) granules of 0.025 inches mean size, which had been treated with a cationic polymer. The variable speed mixer was set at a moderate speed, so that the EPS was able to contact the metal sulfides and be bound thereto by the flocculating polymer; more violent mixing would be expected to prevent effective binding. The flocculent polymers attached the metal sulfides to the EPS and the flocculated mixture floated to the top of the tank, forming a floating mat. The use of a mixer can likely be avoided in a commercial realization of the invention, and the efficient contacting of the metal sulfides with the EPS be accomplished by natural mixing in-line. This was demonstrated in another pilot-scale test were metal sulfide precipitates were first flocculated with an anionic polymer. Then they were mixed inline with EPS that was treated with a cationic polymer. The treated water flowed by gravity into the tank at a rate of 10 gallons per minute and excess water, free of metal precipitates, was discharged from the bottom of the tank. The EPS formed a floating mat on the surface of the water. This removed any particles that had not attached inline to the EPS. This test demonstrated that the EPS could be attached inline to the metal sulfides by flocculating polymers and that the combined particles floated to form a secondary collector in a separator tank. The water that percolated through the floating mat of EPS and metal sulfides was clear and free of suspended particles. It was proven that the metal precipitates that did not attach to the ESP in-line attached to the ESP in the floating mat. As a final test to prove that the metal precipitates were being removed by molecular forces provided by the cationic polymer and not by in-depth filtration, the present inventor gently agitated the bed to see if the metal precipitates released from the ESP. The particles did not release from the ESP showing that in-depth filtering was not occurring. The particles were being removed by molecular forces between the anionic and cationic polymers.

While not proven, experience leads the present inventor to theorize that first the negative-charged anionic polymer attracts the positive-charged metal precipitates and forms a floc that now has a negative charge. The positive-charge cationic polymer attaches to the EPS giving the EPS a positive charge. When the negative-charged metal precipitate comes into contact with the positive-charged EPS, the opposite charges attract causing the metal precipitates to attach to the EPS.

The flocculating polymers forms a bond between the EPS and the metal precipitate sufficient to withstand the forces of flotation and those encountered during removal of the flocculated materials from the water. When it is necessary to separate the metal precipitates from the EPS, high-shear mixing can be performed to break the particle bonds. After the bonds are broken, the liberated EPS can be separated from the metal precipitate by flotation, cleaned, and reused. Alternatively, the separation and cleaning process can include any process that can effectively separate the fine contaminant particles from the buoyant seed material, e.g., mechanical separation, pH or chemical treatment, heat, biological treatment, or ultrasonic treatment. The remaining fine contaminant particles are removed by gravity from the system and dewatered with appropriate dewatering equipment. The recovered EPS can be reused many times and testing has confirmed that there is no practical limit to the number of times it can be reused. However, some small quantity of the EPS is lost in the process and must be replenished as necessary.

The addition of buoyant material according to the present invention to remove particulates from a water stream is effective when the particles are small and lightweight and are amenable to flotation. The invention is suitable for large-scale applications with high flow rates because few moving parts are involved, the storage vessels required need only be large enough to contain the water for a short period of time, and flow is by gravity. The process can also be performed inline and tanks are not necessary. This makes the process especially attractive for large-scale operations that have space and capital cost limitations.

There are a number of buoyant seed materials that can be used. Any material that exhibits strong positive buoyancy, will not become water logged over time, and can be attached to fine contaminant particles by flocculating polymers can be used. The preferred embodiment of the invention is to use an expanded closed-cell plastic material such as EPS. This material is available as a waste product, has strong positive buoyancy and is chemically inert in most circumstances. Suitable waste material comes in all sizes and can be ground up into small granules without noticeably affecting its closed cell structure and its buoyancy. EPS waste material also comes in a variety of densities. Different types of materials were tested with no apparent difference in performance. However, it is preferred that the materials used have high buoyancy. The EPS granules are also strong and can withstand repeated cleanings. If EPS is not chemically compatible with the wastewater, other expanded plastics such as expanded polyethylene and expanded polypropylene can be substituted.

Similarly, any of a wide range of well-known flocculating polymers can be used. Those used in the tests reported herein, which appear to be fully suitable, are available from Stockhausen under product numbers K111L and A3040L.

BRIEF DESCRIPTION OF THE SEVERAL VIEWS OF THE DRAWING

The present invention will be better understood if reference is made to the accompanying drawings, in which.

DETAILED DESCRIPTION OF THE INVENTION

Figure 1:
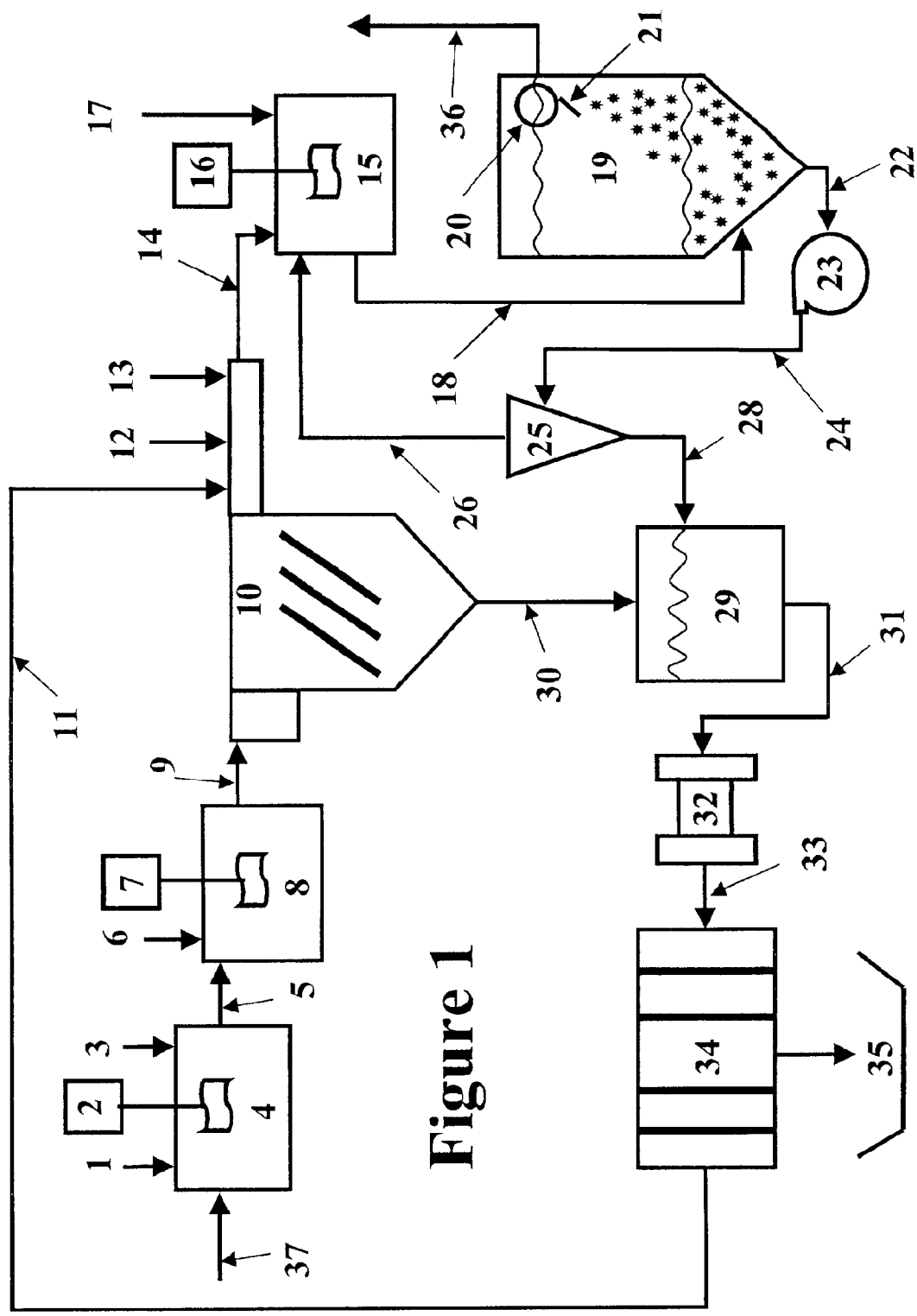
FIG. 1 shows a schematic diagram of a system for practicing the method of the present invention, using magnetic separation.

For illustrative purposes, the magnetic separation embodiment and the expanded plastics flotation embodiment were selected for data collection to demonstrate the effectiveness of a two-stage precipitation process with a selected "field separation" process. Equipment limitations prevented collecting data for the DAF and vortex separation technologies but it is known in the art that these technologies can effectively remove fine particles.

The first step of the method of the present invention is to remove heavy metals by hydroxide precipitation. Over a number of laboratory tests from all types of water, the first step precipitation resulted in removal efficiencies of 95.7–98.5% with an average removal efficiency of 96.8%. This removal level lowered the dosage requirements for advanced metal precipitants by 89%. The main goal of this testing was to prove that lesser quantities of treatment chemicals would be used, while better metal removal levels would be attained following the practices of the present invention.

Chelated copper wastewater samples, taken from the printed circuit board industry, were selected to demonstrate the effectiveness of the present invention. Five samples were separately tested, first using the conventional one-step sulfide process, and then using the two-step (hydroxide and sulfide) process of the present invention. The results of the tests, showing the copper content of the samples in parts per million (ppm) before and after treatment, are as follows:

| | One- and Two-step precipitation data | | | | |
|---|---|---|---|---|---|
| | Original Copper (ppm) | Sulfide Precipitant (ppm) | Ferrous Chloride (ppm) | $1^{st}$ Step Copper (ppm) | $2^{nd}$ Step Copper (ppm) |
| Sample 1 | | | | | |
| One-step process | 16.4 | 100 | 100 | 0.12 | N/A |
| Two-step process | 16.4 | 10 | 10 | 0.70 | 0.01 |
| Sample 2 | | | | | |
| One-step process | 69.3 | 250 | 360 | 0.05 | N/A |
| Two-step process | 69.3 | 50 | 50 | 2.87 | 0.01 |
| Sample 3 | | | | | |
| One-step process | 25.2 | 150 | 200 | 0.47 | N/A |
| Two-step process | 25.2 | 10 | 10 | 0.73 | 0.06 |
| Sample 4 | | | | | |
| One-step process | 46.4 | 150 | 300 | 0.31 | N/A |
| Two-step process | 46.4 | 10 | 20 | 0.70 | 0.09 |
| Sample 5 | | | | | |
| One-step process | 21.9 | 100 | 200 | 1.01 | N/A |
| Two-step process | 21.0 | 25 | 50 | 4.41 | 0.19 |

The above data shows that even though the precipitants were added in lower quantities when the two-step process of the present invention was practiced, lower copper concentrations in the water sample were achieved. Thus, better water quality as well as substantial cost savings, result from use of the present invention. The metal precipitants added for the second step of the precipitation process react with dissolved metals that did not precipitate in the first step. The above data shows how effective the two-step precipitation process (hydroxide and sulfide) is over the one-step precipitation process (sulfide only).

The metal precipitant used for the second step precipitation for the tests was an inorganic sulfide and a small amount of ferrous was added to lower the metals in the treated water. The sulfide precipitates had a characteristically small particle. They were too fine to easily settle by gravity and required the use an organic flocculent.

Conventional separation methods can be used, as discussed in detail below, but a preferred mode of practice embodied in this invention employs a magnetic separator and a magnetic seed material in the separation step.

Magnetic seeding is a technology for the enhanced removal of magnetic and non-magnetic particulates from liquids. It involves the addition of a small amount of magnetic seed particles, preferably magnetite (a naturally occurring iron oxide); however, other materials showing magnetic susceptibility such as iron powder are suitable and are within the scope of the present invention. These magnetic seed particles are made to attach to non-magnetic metal sulfides by the use of a flocculating polymer (preferably an anionic polymer). Then a magnetic separator removes the flocculated particles that have high magnetic susceptibility derived from the magnetic seed material. This magnetic seeding technique is applicable to a wide range of liquid wastes including contaminated groundwater, process waters, municipal wastewater, and industrial wastewater.

The effectiveness of magnetic seeding with magnetite is determined by measuring the level of suspended particles (ppm) before treatment and after treatment with a magnetic separator. The magnetic separator can be any device that produces a magnetic field, used to apply a magnetic force on a particle that exhibits magnetic properties but the preferred embodiment is the use of a permanent magnet because of cost.

Tests were performed to determine the effectiveness of the invented process to remove fine particles from water. The present invention was specifically tested against gravity clarification without the use of magnetite.

The following data shows how effective the use of a magnetic seed and a magnetic separator according to the present invention is on a variety of water samples, as compared to a simple gravity-settling clarification process. Anionic flocculants (A3040L) were added to all samples. Total suspended solids (TSS) determination using Hach DR 2010 equipment was the measure of how effectively fine particles were removed. The industrial wastewaters and potable water were first treated with metal precipitants that added to the amount of fine particles to be removed. No metal precipitants were used with the municipal and storm water samples because these waters already contained a large quantity of fine particles and ordinarily do not require metal removal.

|  | Clarification | | Magnetic Separator | |
|---|---|---|---|---|
|  | Initial TSS | Final TSS | Initial TSS | Final TSS |
| Potable water | 8 | 3 | 8 | 4 |
| Storm water | 550 | 19 | 550 | 8 |
| Municipal wastewater | 154 | 10 | 154 | 4 |
| Industrial wastewater 1 | 67 | 17 | 67 | 13 |
| Industrial wastewater 2 | 220 | 9 | 220 | 6 |
| Industrial wastewater 3 | 160 | 21 | 160 | 1 |

All final samples were allowed to settle for one minute before TSS readings were taken. The magnetic separator samples were then treated with a bar magnet to remove any remaining TSS.

As is apparent from this data, the addition of magnetite and providing a magnetic separation step according to the present invention improved the effectiveness of the separation with respect to each sample (except for the potable water sample), and in some cases the improvement was well over 100%.

The present inventor then determined if recirculating the collected magnetic particles had any adverse effects on the collection of new magnetic particles. The precipitate collected from each previous laboratory sample was added to each subsequent sample. This recirculation of solids improved the flocculation of the tested sample. The water was visibly clearer and the dissolved metal levels were lower. Although not intending to be bound thereby, the inventor theorizes that this recirculation of solids lowers the level of dissolved metals in the wastewater because the reaction has additional time to go to completion and the recirculated metal sulfide precipitates absorb additional dissolved metals. The improved flocculation is a result of having more solids present to increase the number of collisions between particles, which improves flocculation.

While a preferred embodiment of the present invention has been disclosed in detail, those skilled in the art will recognize that numerous improvements or modifications thereon are intended to be within its scope.

Tests were performed to determine the effectiveness of enhance flotation using expanded plastics to remove fine particles from water. The process of the present invention was implemented essentially as above, and was also specifically tested against gravity clarification.

The following data compares the effectiveness of using expanded plastics according to the invention to remove fine contaminant particles from a water stream to a simple gravity-settling clarification process. These tests were performed on a variety of different samples of water, as listed below. The total suspended solids (TSS) in each sample were measured using Hach DR 2010 equipment to determine how effectively fine particles were removed. The industrial wastewaters and potable water were first treated with sulfide metal precipitants that formed particulates, thus adding to the amount of fine particles to be removed. No metal precipitants were added to the municipal and storm waters because these waters already contained a large quantity of fine particles and ordinarily do not require metal removal.

The expanded plastics (in this case EPS), was added to each sample in the amount of 1 percent by weight. For comparison purposes, ferrous sulfide was added at a concentration of approximately 50 ppm. The flocculant used comprised a cationic polymer added to the EPS at a dose of 20 ppm and an anionic polymer added to the water stream containing the ferrous sulfide particulates at a dose of 10 ppm.

|  | Clarification | | Expanded Polystyrene | |
|---|---|---|---|---|
|  | Initial TSS | Final TSS | Initial TSS | Final TSS |
| Potable water | 8 | 3 | 8 | 5 |
| Storm water | 550 | 19 | 550 | 12 |
| Municipal wastewater | 154 | 10 | 154 | 8 |
| Industrial wastewater 1 | 67 | 17 | 67 | 12 |
| Industrial wastewater 2 | 220 | 9 | 220 | 7 |
| Industrial wastewater 3 | 160 | 21 | 160 | 14 |

The clarifier samples were allowed to settle for one minute and the EPS samples were allowed to float for one minute before TSS readings were taken.

As is apparent from this data, seeding the water with expanded plastics and flocculating polymers according to the present invention improved the effectiveness of the separation with respect to each sample; in some cases, the improvement was well over 100%.

It will be apparent to those skilled in the art that allowing the samples to settle longer in the clarifying tanks would have led to improved results. However, as noted, it is generally the case that some fraction of the particulates are not removed in the clarifying process; accordingly, deliberate enhanced flotation and removal according to the present invention can yield substantially improved results regardless of the amount of settling time provided in a clarifying tank.

While improvement in clarification is important, it is also important that the method described in this present invention is able to process water quickly. The biggest drawback to clarification by settling is that it takes large-capacity equipment to be able to process reasonable quantities of water, as the required residence time in a clarifier may range from 30 minutes to several hours. If a clarifier is being used, it is important to maintain a slow and non-turbulent flow to allow the flocculated particles to settle. Contrary to this, the present invention allows rapid flow because the buoyant flocculate will float very rapidly and completely. The residence time to remove the fine particles with this present invention is in the order of one minute as compared to the 30-minute minimum required for clarification by gravity settling without added ballast.

Another test was performed to evaluate the effectiveness of separating the EPS particles that have been bound in-line to the metal precipitates from the treated water. This was easily accomplished by discharging the flow into a separation tank. The EPS floated on the surface of the water while the clear treated water was withdrawn from the bottom of the tank. The EPS floating on the surface of the water in the tank formed a mat which removed any metal precipitates that had not been bound to the EPS in-line.

In conclusion, the laboratory tests completed to-date by the present inventor show that an expanded plastic material such as EPS can be effectively attached to fine contaminant particles with the use of flocculating polymers, preferably anionic and cationic polymers; one flocculated with the metal precipitates and the other bound to the EPS. The combined particles floated on the water's surface and were easily removed. The resulting water was clear of suspended solids to the naked eye, and resulted in low suspended solids measured by Hach equipment. Mixing under high shear conditions easily separated the EPS and particulates bound thereto, allowing the EPS to be reused over and over again. The shear mixing to separate the EPS from the fine particles did not noticeably affect the buoyancy of the EPS.

Tests were performed to prove that the metal precipitates were attached to the ESP in the floating mat by molecular forces rather than by in-depth filtration. Three samples were prepared for testing. One sample constituted the blank and contained only water containing ESP treated with a cationic polymer, one sample contained ESP treated with an anionic polymer, and the third sample contained ESP treated with a cationic polymer. Then a sample of water containing a metal hydroxide flocculated with an anionic polymer was passed through the sample containing the ESP with the anionic polymer, and an equal quantity of water containing an equal amount of metal hydroxide flocculated with an anionic polymer was passed through the second sample containing the ESP treated with the cationic polymer. The water that percolated through the ESP floating mats were tested for Total Suspended Solids (TSS) to determine the effect of the polymers on the ESP's ability to remove the metal precipitates. Then the floating beds of ESP were gently agitated to see if the metal precipitates would be released back into the water. The following data was collected:

|  |  | TSS | TSS (after bed agitation) |
|---|---|---|---|
| Blank | (ESP treated with a cationic polymer) | 13 | 13 |
| Sample 1 | (ESP treated with an anionic polymer plus metal hydroxides) | 191 | >3800 |
| Sample 2 | (ESP treated with a cationic polymer plus metal hydroxides) | 10 | 8 |

In summary, the ESP treated with a cationic polymer was able to collect all the metal precipitate with no breakthrough (Sample 2). The TSS reading was actually less after the metal hydroxides were added. The Sample 1 containing the anionic polymer had breakthrough of the metal hydroxides. After agitating the beds, almost all of the metal hydroxides went back into the water for the sample containing the anionic polymer. However, the sample containing the cationic polymer (Sample 2) still retained all the metal hydroxides even after the bed was agitated.

Those skilled in the art will recognize that numerous additions and modifications to the present invention can be made without departure from its essential spirit and scope, as exemplified but not limited by the above disclosure.

FIGS. 1–4, described in the following, schematically illustrate various process arrangements that may be used to implement the present invention. Again, the preferred mode employs magnetic separation techniques and expanded plastics flotation, but the other techniques mentioned are within the scope of the invention, and may be preferred in various circumstances.

Magnetic Separation: FIG. 1

In this implementation of the present invention, water first enters through pipeline (37) into a pH adjustment tank (4) including a high speed mixer (2), in which the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where an anionic polymer (6) is added to flocculate the hydroxide precipitate. A slow speed mixer (7) aids the formation of floc. The water and metal hydroxide precipitates then flow through a pipeline (9) into a clarifier (10) where metal hydroxide precipitates settle out of the wastewater and flow through a pipeline (30) and into a sludge settling tank (29). From here the slurry flows through pipeline (31) and is pumped (32) through a pipeline (33) to a filter press (34) for dewatering. The dewatered sludge is discharged to a hopper (35) and disposed of or recycled. The filtrate from the filter press (34) flows back through pipeline (11) and is treated for metal removal. At the discharge from the clarifier (10), metal precipitant (12) and ferrous (13) are added. The metal precipitates then flow through a pipeline (14) to a flocculating tank (15). Here an anionic flocculating polymer (17) is added to flocculate the metal precipitate with the recycled magnetic seed material coming from pipeline (26). A slow speed mixer (16) aids in the flocculation process. The flocculate then flows through pipeline (18) into a separator tank (19). Much of the dense sludge settles to the bottom of the separator tank by gravity but fine particles are swept into the upper region of the separator tank by the water flow. These particles are captured by a magnetic separator (20) to prevent their discharge through pipeline (36). A scraper (21) is installed in the separator tank (19) for cleaning when it becomes heavily laden with magnetic particles. These particles scraped from the magnetic separator (20) then settle to the bottom of the separator tank (19) and are discharged through pipeline (22). A pump (23) then pumps the sludge to a magnetic seed cleaning tank (25). Here the magnetic seed material is separated from the metal precipitates. The magnetic seed material flows through pipeline (26) and is reused in the process. The metal precipitates flow through pipeline (28) into the sludge settling tank (29) for subsequent dewatering and disposal. Those of skill in the art will recognize that numerous modifications, enhancements and improvements on this implementation are possible without departure from the scope of the present invention.

Figure 2:
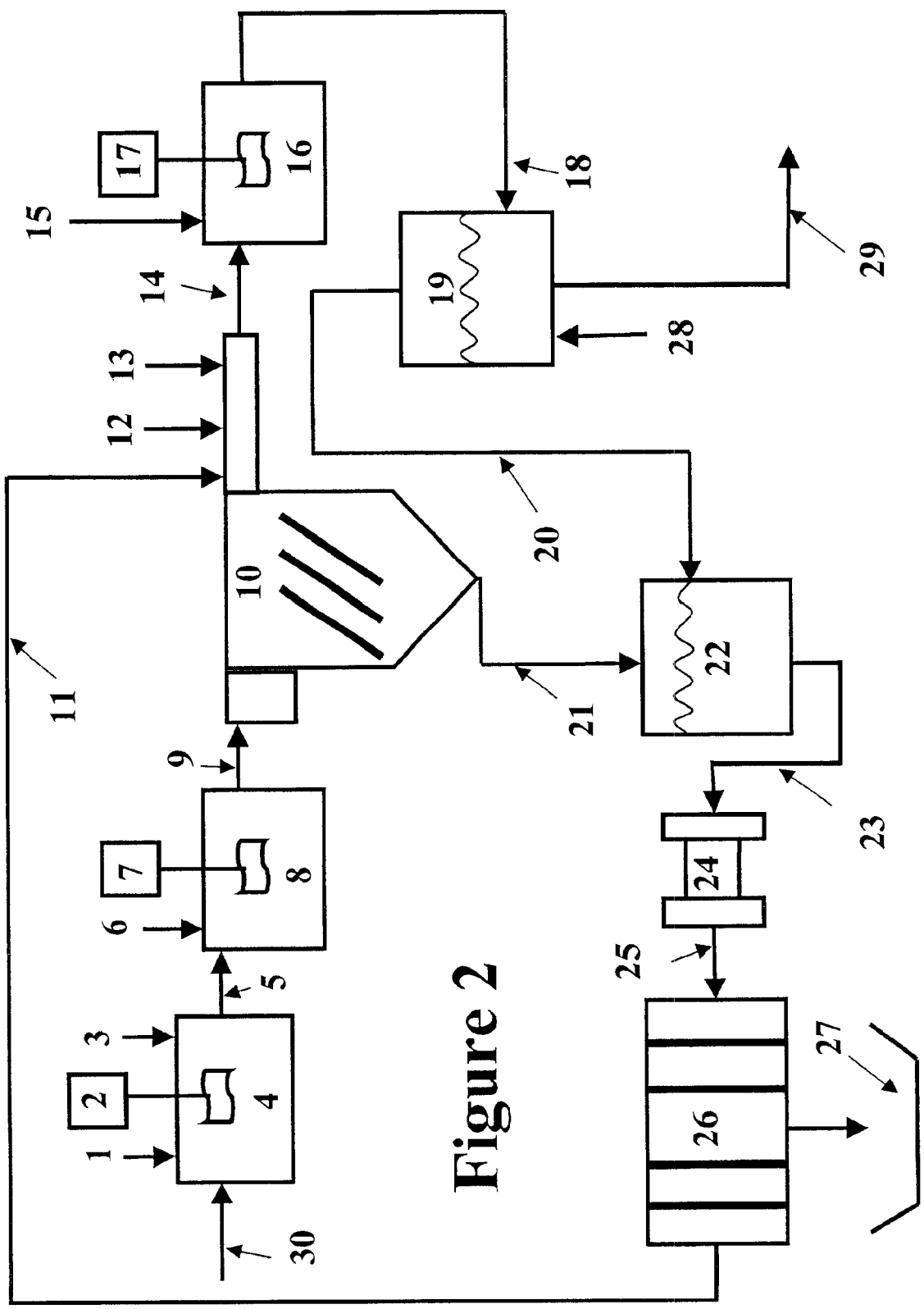
FIG. 2 shows a schematic diagram of a system for practicing the method of the present invention, using dissolved air flotation.

Dissolved Air Flotation: FIG. 2

In this implementation of the present invention, water first enters through pipeline (30) into a pH adjustment tank (4) where it is mixed with a high-speed mixer (2) and in which, the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where a polymer (preferably anionic) (6) is added to flocculate the hydroxide precipitate. A slow-speed mixer (7) aids the formation of floc. The water and metal hydroxide precipitates then flow through a pipeline (9) into a clarifier (10) where metal hydroxide precipitates settle out of the wastewater and flow through a pipeline (21) into a sludge settling tank (22). From here the slurry flows through a pipeline (23) and is pumped (24) through a pipeline (25) into a filter press (26) for dewatering. The dewatered sludge is discharged to a hopper (27) and disposed of or recycled. The filtrate from the filter press flows through a pipeline (11) back to the discharge point of the clarifier for metal removal. At the discharge from the clarifier (10), metal precipitant (12) and ferrous material (13) are added. The flocked particles flow through a pipeline (14) and into a flocculation tank (16). Here a polymer (preferably an anionic polymer) is added at point (15) and the solution allowed to mix with the aid of a slow-speed mixer (17). The flocculated particles then flow through a pipeline (18) into a dissolved air flotation (DAF) device (19). Air is injected at point (28), which attaches to the flocculated particles causing them to rise to the top of the DAF (19). The sludge then flows through pipeline (20) into the sludge settling tank (22) and clean water from the DAF (19) flows out the bottom and is discharged through pipeline (29). The sludge collected in the sludge settling tank (22) flows through pipeline (23) and is pumped (24) through pipeline (25) and into a filter press (26) for dewatering. The dewatered sludge is discharged into a collection hopper (27) and disposed while the filtrate flows through pipeline (11) into the discharge from the clarifier (10) for metal removal. Those of skill in the art will recognize that numerous modifications, enhancements and improvements on this implementation are possible without departure from the scope of the present invention.

Figure 3:
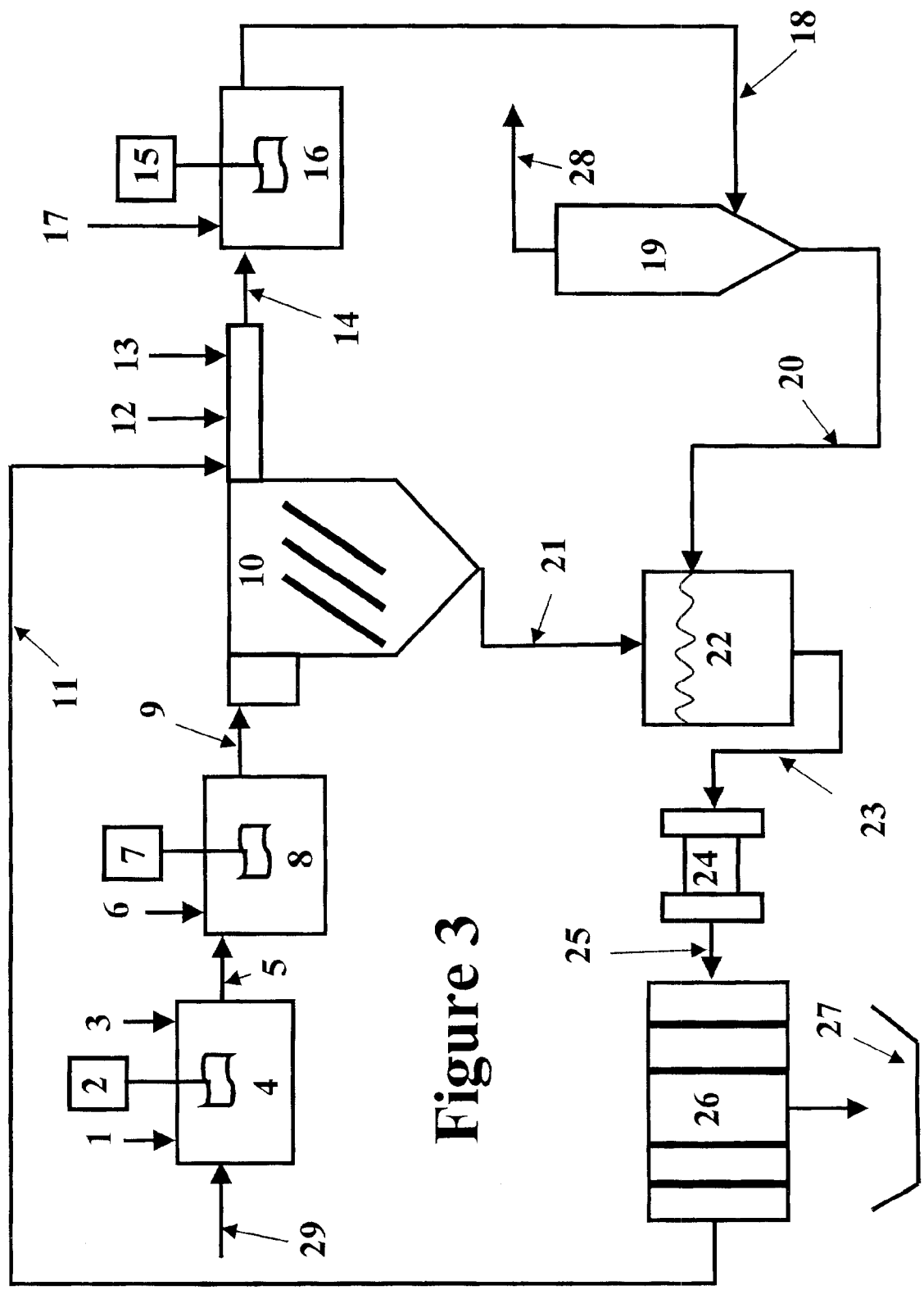
FIG. 3 shows a schematic diagram of a system for practicing the method of the present invention, using vortex separation.

Vortex Separation: FIG. 3

In this implementation of the present invention, water first enters through pipeline (29) and into a pH adjustment tank (4) comprising a high-speed mixer (2), and in which the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where a polymer (6) (preferably anionic) is added to flocculate the hydroxide precipitate. A slow speed mixer (7) aids the formation of floc. The water and metal hydroxide precipitates then flow through a pipeline (9) to a clarifier (10) where metal hydroxide precipitates settle out of the wastewater and flow through a pipeline (21) into a sludge settling tank (22). From here the slurry flows through pipeline (23) and is pumped (24) through a pipeline (25) to a filter press (26) for dewatering. The dewatered sludge is discharged to a hopper (27) and disposed of or recycled. The filtrate flows through pipeline (11) from the filter press back to the discharge point of the clarifier (10) for metal removal. At the discharge from the clarifier (10), metal precipitant (12), and ferrous material (13) are added to precipitate any residual metals. The metal precipitates flow through a pipeline (14) and into a flocculation tank (16). Here a polymer (17) (preferably an anionic polymer) is added and the solution allowed to mix with the aid of a slow-speed mixer (15) to increase the floc size. The flocculation formed then flows through a pipeline (18) into a vortex separator (19). The clean water rises to the top of the vortex separator (19) and is discharged through pipeline (28) while the heavy particles settle to the bottom of the vortex separator (19). The sludge from the bottom of the vortex separator (19) then flows through pipeline (20) into the sludge settling tank (22). Here the precipitates settle to the bottom and are discharged through a pipeline (23) and are pumped (24) through pipeline (25) into a filter press (26) for dewatering. The dewatered sludge is discharged to a hopper (27) and disposed or recycled. Magnetite can be used in the process to promote rapid settling in the vortex separator (19). When cost justified, the preferred embodiment of the present invention is to recycle the magnetite by shearing the bond between the metal sulfides and magnetite with high-speed agitation and returning the magnetite back to the flocculation tank (16). Those of skill in the art will recognize that numerous modifications, enhancements and improvements on this implementation are possible without departure from the scope of the present invention.

Figure 4:
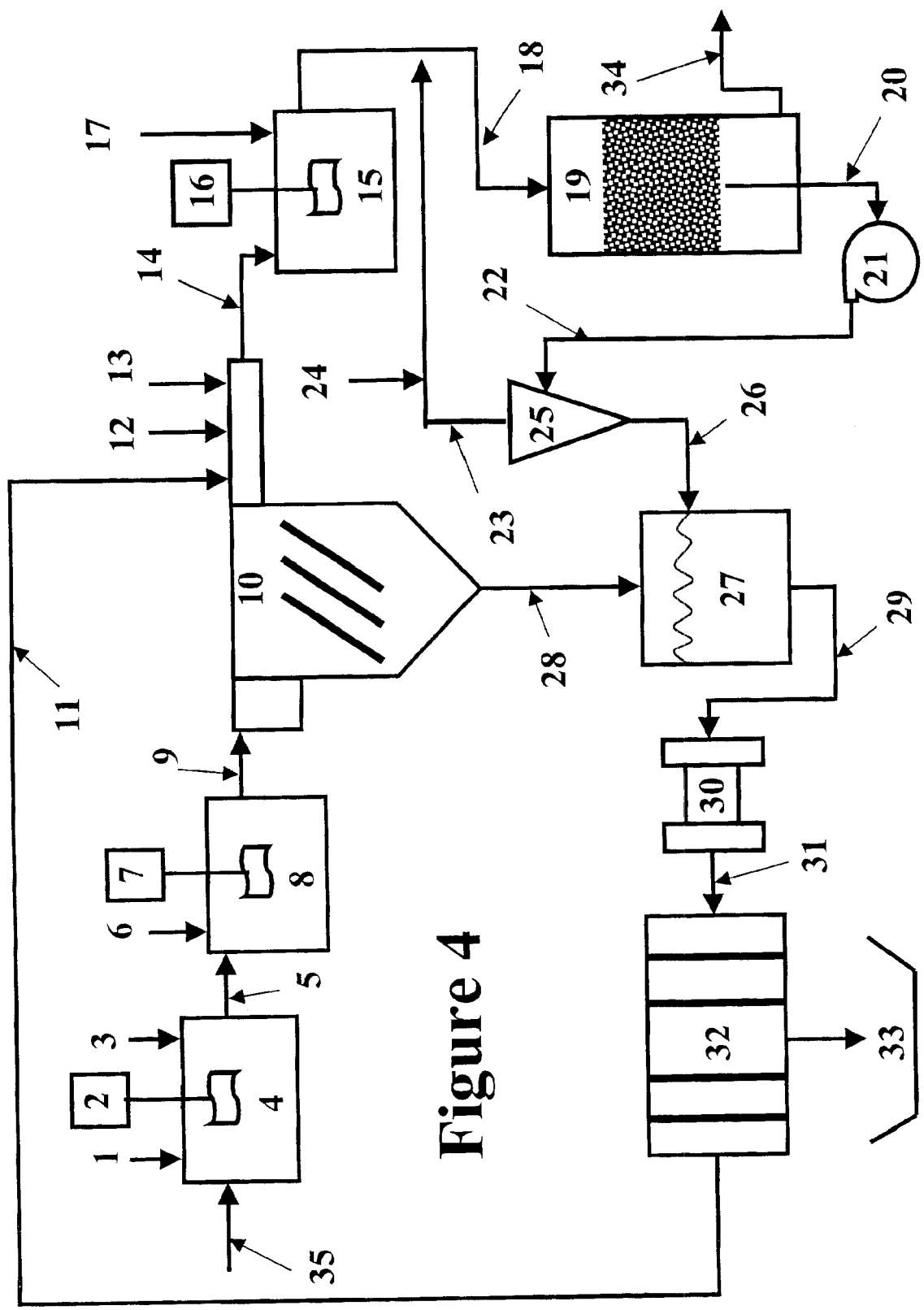
FIG. 4 shows a schematic diagram of a system for practicing the method of the present invention, using expanded plastics flotation.

Expanded Plastics Flotation: FIG. 4

In this implementation of the present invention, water first enters through a pipeline (35) into a pH adjustment tank (4) including a high speed mixer (2), in which the pH is adjusted with either acid (1) or caustic (3) to the optimum pH for metal hydroxides to form. For mixed metal solutions, the pH that removes the most metals is selected. The water then flows through a pipeline (5) into a flocculation tank (8) where an anionic polymer (6) is added to flocculate the hydroxide precipitate. A slow speed mixer (7) aids in the formation of floc. The water and metal hydroxide precipitates then flow through a pipeline (9) into a clarifier (10) where metal hydroxide precipitates settle out of the wastewater and flow through a pipeline (28) and into a sludge settling tank (27). From here the slurry flows through pipeline (29) and is pumped (30) through a pipeline (31) to a filter press (32) for dewatering. The dewatered sludge is discharged to a hopper (33) and disposed of or recycled. The filtrate from the filter press (32) flows back through pipeline (11) and is treated for metal removal. At the discharge from the clarifier (10), metal precipitant (12) and ferrous (13) are added. The metal precipitate particles then flows through a pipeline (14) to a flocculating tank (15). Here an anionic flocculating polymer (17) is added to flocculate the metal precipitate. A slow speed mixer (16) aids in the flocculation process. The flocculate then flows through pipeline (18) into a separator tank (19). The separator tank (19) contains a floating bed of granulated styrofoam. The styrofoam has a positive charge from the addition of a cationic polymer at point (24). The flocculated metal precipitates from the flocculation tank (15) have a negative charge from the addition of an anionic polymer at point (17). When the metal precipitate comes into contact with the styrofoam, their opposite charges attract causing them to stick together. Clean water is discharged through pipeline (34) and a pipeline (20) located in the separation tank (19) at a point just below the interface between the floating styrofoam and the water withdraws the dirty styrofoam and is pumped (21) through a pipeline (22) to a styrofoam cleaning tank (25). The action of the pump (21) causes the metal precipitates to be sheared away from the styrofoam. The cleaned styrofoam goes back into the process through pipeline (23) to be used over again and the metal precipitate sludge flowing through pipeline (26) goes into the sludge settling tank (27) for eventual dewatering and disposal. Those of skill in the art will recognize that numerous modifications, enhancements and improvements on this implementation are possible without departure from the scope of the present invention.

What is claimed is:

1. A water treatment method comprising the following steps:
    (a) Precipitating heavy metals by adding lime, limestone, caustic, magnesium hydroxide, soda ash or any other material that will precipitate the heavy metals as hydroxides or carbonates;
    (b) Removing the precipitated heavy metal formed in step (a) by gravity clarification methods or by field separation methods selected from the group consisting of magnetic separation, dissolved air flotation, vortex separation, expanded plastic flotation or any other method that uses field forces rather than filtration to remove particles from the water;
    (c) Precipitating the residual heavy metals remaining in solution after steps 1(a) and 1(b) by using organic sulfides, inorganic sulfides, sodium borohydride, ferrous, or any other chemical that can precipitate more metals from the water than hydroxide and carbonate chemicals; and
    (d) Removing the heavy metals precipitated in step 1(c) by field separation methods selected from the group consisting of gravity clarification, magnetic separation, dissolved air flotation, vortex separation, expanded plastic flotation or any other method that uses field forces rather than filtration to remove particles from the water wherein at least one of said removal steps (b) or (d) is performed by magnetic separation using a bonding agent comprising an organic flocculating polymer to attach magnetic seed material to non-magnetic particles and/or metal precipitated particles, so as to allow the bonded particles to be removed from the water by magnetic forces, and wherein the steps of using a bonding agent to attach the magnetic seed material to the particles to be removed and the step of removal of the magnetic seed material with the particles to be removed attached thereto are performed in the same vessel.

2. The method of claim 1 where the magnetic seed material is magnetite ($Fe_3O_4$).

3. The method of claim 1 comprising the further step of separating the metal precipitates or fine particles from the magnetic seed material, for reuse of the magnetic seed material by using mechanical force, heat, biological treatment, ultrasonic force, pH alteration or chemical force.

4. The method of claim 1 wherein the heavy metals to be removed from water include cadmium, chromium, copper, lead, mercury, nickel, zinc and combinations thereof.

5. The method of claim 1 wherein the particles to be removed from water include precipitates, clay, silt, organic material and combinations thereof having a particle size of less than 200 microns.

6. The method of claim 1 wherein the waters to be thus treated include industrial wastewater, municipal wastewater, potable water, makeup water, groundwater, surface water, stormwater, and combinations thereof.

7. A water treatment method comprising the following steps:

(a) Precipitating heavy metals by adding lime, limestone, caustic, magnesium hydroxide, soda ash or any other material that will precipitate the heavy metals as hydroxides or carbonates;

(b) Removing the precipitated heavy metal formed in step (a) by gravity clarification methods or by field separation methods selected form the group consisting of magnetic separation, dissolved air flotation, vortex separation, expanded plastic flotation or any other method that uses field forces rather than filtration to remove particles from the water;

(c) Precipitating the residual heavy metal remaining in solution after steps 1(a) and 1(b) by using organic sulfides, inorganic sulfides, sodium borohydride, ferrous, or any other chemical that can precipitate more metals from the water than hydroxide and carbonate chemicals; and (d) Removing the heavy metals precipitated in step 1(c) by field separation methods selected from the group consisting of gravity clarification, magnetic separation, dissolved air flotation, vortex separation, expanded plastic flotation or any other method that uses field forces rather than filtration to remove the particles from the water (e) wherein a bonding agent comprising an organic flocculating agent is employed to attach metal precipitates or other fine particles to expanded plastic with a density less than water, so that the attached particles can be removed by flotation forces.

8. The method of claim 7, wherein the expanded plastic is expanded polystyrene.

9. The method of claim 7, comprising the further step of separating the expanded plastic from the metal precipitates or fine particles for reuse by application of mechanical forces, heat, biological treatment, ultrasonic, pH alteration, or chemical forces.

10. The method of claim 7 wherein the heavy metals to be removed from water include cadmium, chromium, copper, lead, mercury, nickel, zinc and combinations thereof.

11. The method of claim 7 wherein the particles to be removed from water include precipitates, clay, silt, organic material and combinations thereof having a particle size of less than 200 microns.

12. The method of claim 7 wherein the waters to be thus treated include industrial wastewater, municipal wastewater, potable water, makeup water, groundwater, surface water, stormwater, and combinations thereof.

* * * * *